United States Patent [19]

Andre et al.

[11] Patent Number: 5,096,206

[45] Date of Patent: Mar. 17, 1992

[54] PIPE JOINT SEALER

[75] Inventors: James R. Andre, Newport Beach; Paul A. Carothers, Carmichael, both of Calif.

[73] Assignee: W. E. Hall Company, Newport Beach, Calif.

[21] Appl. No.: 532,028

[22] Filed: Jun. 1, 1990

[51] Int. Cl.⁵ .................. F16J 15/10; F16L 21/00
[52] U.S. Cl. .................. 277/1; 29/525.1; 29/527.1; 52/169.14; 277/207 A; 277/229; 277/DIG. 6; 285/231; 285/236; 285/285; 285/910; 285/925
[58] Field of Search ............ 277/1, 207 A, 212, 101, 277/227, 237, 228, 229, DIG. 6, 230, 34.3; 285/925, 923, 346, 284, 285, 236, 231, 910; 206/497; 49/475; 52/169.14, 309.6; 29/525.1, 527.1

[56] References Cited

U.S. PATENT DOCUMENTS

| | | | |
|---|---|---|---|
| 907,136 | 12/1908 | Farrington et al. | 277/237 |
| 2,094,691 | 10/1937 | Williams | 277/1 |
| 2,686,747 | 8/1954 | Wurtz et al. | 277/228 |
| 2,859,061 | 11/1958 | Reid | 277/228 |
| 2,898,634 | 8/1959 | Alderfer | 49/475 X |
| 2,915,110 | 12/1959 | Ferguson et al. | 285/285 X |
| 3,219,368 | 11/1965 | Crumpler | 71/65 |
| 3,286,341 | 11/1966 | Miller | 285/285 X |
| 3,491,825 | 1/1970 | Peterson et al. | 277/34.3 X |
| 3,637,224 | 1/1972 | Triplett et al. | 277/229 |
| 3,809,223 | 5/1974 | Kendall | 206/497 X |
| 3,917,285 | 11/1975 | Swanson et al. | 277/1 |
| 4,360,227 | 11/1982 | Bridges | 277/101 |
| 4,443,019 | 4/1984 | Ishido et al. | 277/227 |
| 4,715,609 | 12/1987 | Mino et al. | 277/228 |
| 4,865,210 | 9/1989 | Brainard, II | 206/497 X |
| 4,892,891 | 1/1990 | Close | 428/423.1 X |

Primary Examiner—Allan N. Shoap
Attorney, Agent, or Firm—Stetina and Brunda

[57] ABSTRACT

A pipe joint sealer for providing a watertight joint in metal pipe, cast concrete pipe, plastic pipe and the like is disclosed. The pipe joint sealer prevents fine dirt and sand from entering the pipe through the joint. The pipe joint sealer is comprised of an absorbent material such as low density, open cell, resilient foam which is saturated with a quantity of water reactive urethane prepolymer. The urethane prepolymer saturated foam is sandwiched between two layers of a geotextile fabric such as polypropylene which permit moisture to come into contact with the urethane prepolymer saturated foam. Moisture causes the urethane prepolymer saturated foam to expand and thereby form a dynamic watertight seal. Drying of the urethane prepolymer saturated foam causes it to shrink back toward its original volume. Thereafter, the pipe joint sealer of the present invention forms a new watertight seal each time it is wetted. This allows the pipe joint sealer to compensate for shifts in joint position caused by settling and the like. Plant root growth inhibitors such as copper, plant copper compounds and herbicides may be included in the urethane prepolymer.

17 Claims, 3 Drawing Sheets

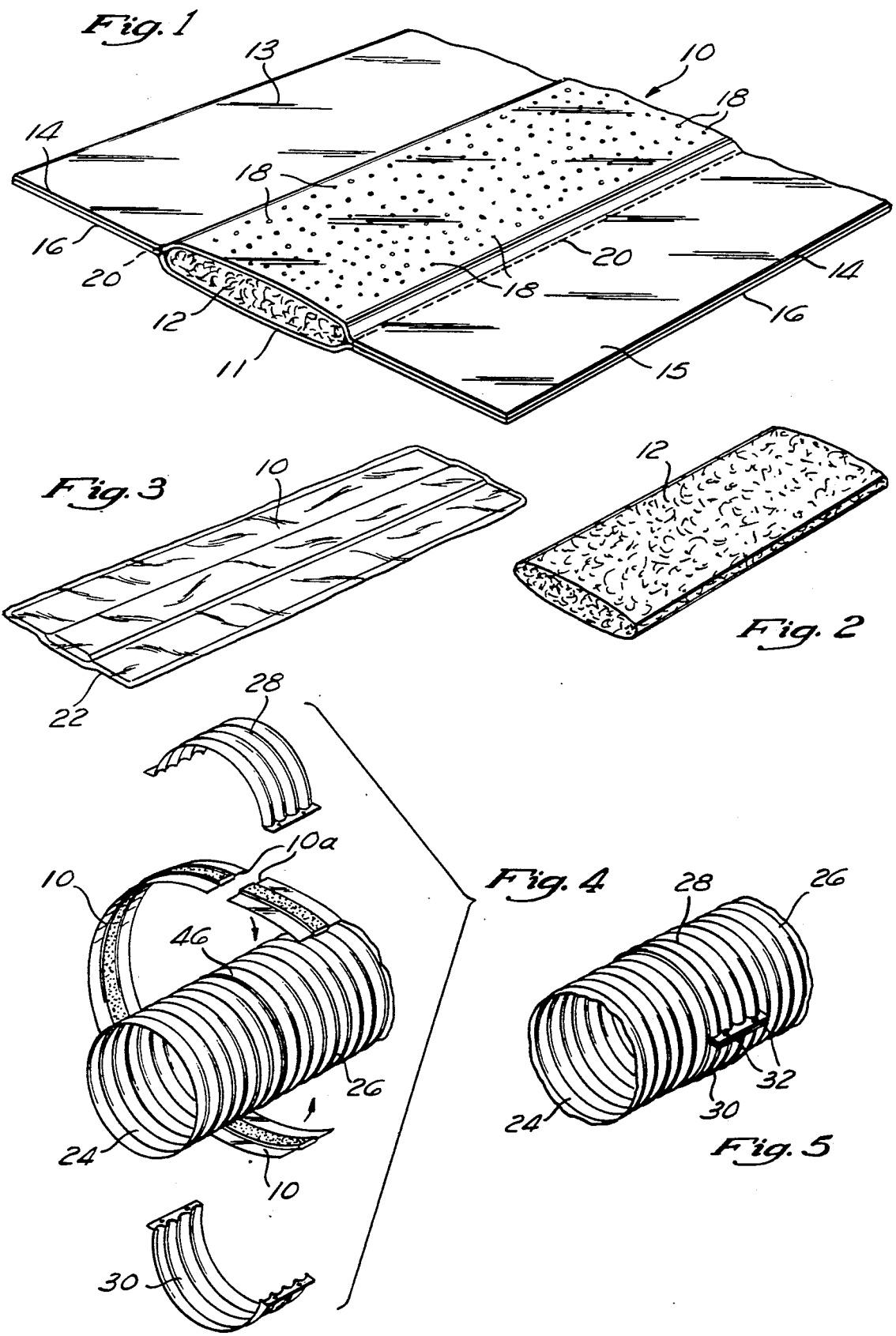

PIPE JOINT SEALER

FIELD OF THE INVENTION

The present invention relates generally to gaskets for sealing pipe joints and more particularly to a pipe joint sealer for providing a watertight joint in metal pipe, concrete pipe, plastic pipe and the like. The pipe joint sealer also prevents fine dirt and sand from entering the pipe through the joint.

BACKGROUND OF THE INVENTION

Metal, concrete, plastic and vitreous clay pipe is well known and extensively utilized for drainage, sewage and irrigation purposes. In all such applications, it is desirable to prevent water from leaking out of and into the pipes and also to prevent foreign objects, such as fines and debris, from entering the pipes at joints formed between adjacent pipe lengths.

Metal pipe is often corrugated or ribbed to provide improved structural strength. It is typically joined using band couplers which surround the joint and hold two adjacent pipe lengths together. Band couplers do not prevent water leakage from metal pipes since they do not provide a seal. Band couplers only serve to physically join the two pieces of metal pipe together.

Concrete, vitreous clay, plastic and similar pipes typically are joined by using various bell and spigot fittings formed upon the pipe ends. Each section or length of such pipe will commonly have a bell fitting formed at one end and a spigot fitting formed at the other end. These fittings are sized such that the spigot fitting can be received within the bell fitting. This mechanically joins two pipe lengths together, however it does not prevent water leakage from the pipe joint because the joint does not form a watertight seal. At best, the bell and spigot fittings merely serve to hold the ends of adjacent pipes in alignment as long as the spigot remains within the bell.

As is well known, when metal, concrete, plastic or vitreous clay pipe is used in subterranean formations, it is commonplace to back fill about the subterranean pipes and compact the back fill hard or tightly about the pipe. Due to this soil/pipe interaction, the pipe is supported in the formation to increase the structural integrity of the pipe within the formation. If substantial leakage of adjacent pipe lengths occurs at the joints between adjacent pipe lengths soil infiltration into the interior of the pipe may occur which through prolonged duration eliminates the soil/pipe interaction within the formation. As such, the pipe lengths are subject to moderate movement due to a failure of the back fill to support themselves which in some instances causes a subsidence of the overburden existing above the pipe lengths or in severe instances allows adjacent pipe sections to become disconnected from one another at their joints.

Further, the joints formed in the connection of metal, concrete, plastic and like pipe lengths are continuously subject to invasion by fine dirt, sand, and other foreign matter. Because of the poor seals formed by band couplers and bell/spigot joints, such foreign matter can work its way through the joint and eventually enter the pipe. Once inside the pipe, a buildup of foreign matter can restrict the flow of fluid therein, thus negating the effectiveness of the pipe. The debris from many such joints can accumulate at a single location, sometimes completely restricting water flow.

In recognition of these problems various means of sealing metal, plastic and concrete pipes and the like have been utilized in the prior art. Tapes, cast rubber gaskets, and flexible strips, as well as various chemical sealants have been used in an attempt to prevent water leakage from such pipes and also to prevent foreign matter from leaking into the pipes.

Numerous problems are encountered in the prior art attempts to seal such pipes. Pipes are typically subjected to a wide variety of environmental conditions, such as heat in the summer time, cold in the winter, settling of earth, and movement of the earth, as during earthquakes and construction.

The various sealing means of the prior art are subject to environmental degradation caused by the cyclic temperature changes and relative motion of the two pipe sections forming the joint. Cyclic temperature changes can cause many materials to become brittle and crack over extended periods of time, thus destroying the effectiveness of the sealing material. Relative motion of the pipe sections forming the joint can stretch and compress the sealing material, leaving the sealing material deformed or broken. This likewise destroys the effectiveness of the sealant. Further, prior art and rubber or elastomeric gaskets typically used in corrugated or other pipe sealing applications permanently set under compression within the pipe joints during installation and are incapable of expanding to re-seal the joint during later pipe joint movement.

Therefore, there exists a substantial need in the art to provide a sealing means which assures a watertight seal at the joints and is durable and flexible. The sealing means must be capable of withstanding cyclic temperature changes over extended periods of time and also be durable enough to endure reasonable, i.e. moderate, motion at the pipe joint without becoming permanently deformed or damaged. As such, although the prior art has recognized the need for sealing metal, concrete, plastic, clay pipe and the like from water leakage and the intrusion of foreign matter, the proposed solutions have to date proven generally ineffective in providing a satisfactory remedy.

SUMMARY OF THE INVENTION

The present invention specifically addresses and alleviates the above mentioned deficiencies associated in the prior art. More particularly, the present invention comprises a pipe joint sealer and method of sealing pipe joints which provides a watertight joint in metal pipe, concrete pipe, plastic pipe and the like. The pipe joint sealer of the present invention also prevents fine dirt and sand from entering the pipe through the joint. The pipe joint sealer of the present invention is comprised of an absorbent material such as low density, open cell, resilient foam. The absorbent material is saturated with a quantity of a water reactive material such as urethane prepolymer. The saturated absorbent material is sandwiched between two layers of a durable fabric such as polypropylene textile. Due to porosity of the polypropylene textile material or alternatively plural apertures being formed in one or more layers of the fabric textile material, moisture migrates through the textile material to come into contact with the water reactive saturated absorbent material. Moisture causes the water reactive saturated absorbent material to react within the resilient foam, causing a volumetric expansion to occur within the foam causing the foam to be sealed from normal water absorption while it expands into and fills the available space within the pipe joint creating a flexible water tight seal at the pipe joint. As such, the reactive saturated absorbent material closes off the foam's porosity creating a water barrier while it fills and seals any open spaces existing in the joint unfilled by the foam expansion. Drying of the water reactive saturated absorbent material causes it to shrink back toward its original volume. Thereafter, by such repetitive volumetric swelling and shrinkage the pipe joint sealer of the present invention forms a dynamic watertight seal each time it is wetted by either environmental subterranean moisture or moisture traveling through the interior of the pipe lengths. This allows the pipe joint sealer to compensate for minor shifts in joint position caused by settling, earth movement, earthquakes and the like.

Further, in the event of any major shifts in the earth surrounding the pipe joint which displace the pipe joint beyond normal operational constraints, the polypropylene textile fabric serves to form a physical barrier at the pipe joint to prevent the migration of dirt and fines into or out of the pipe lengths. Further in such situations, the fabric typically fills with fines and serves as a viable conduit for water passing through the interior of adjacent pipe lengths.

Due to the dynamic sealing capabilities of the pipe joint sealer of the present invention, erosion of the soil/pipe interaction is substantially eliminated thereby maintaining the structural integrity of the pipe lengths in subterranean formations. As such, general subsidence of the overfill in the formation is substantially eliminated which additionally eliminates catastrophic joint failure caused by pipe movement within the formation. Further, the pipe joint sealer of the present invention forms a physical barrier to help eliminate any soil infiltration into the interior of the pipe lengths thereby reducing any build up of fines and foreign matter which could restrict the flow of water and the like within the interior of the pipe.

Advantageously, the water reactive prepolymer material may be provided with copper compounds or suitable herbicides to deter plant root growth and root penetration into the pipe joint thereby additionally augmenting the improved sealing capabilities of the present invention These, as well as other future advantages will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of a section of the pipe joint sealer of the present invention;

FIG. 2 is a perspective view of the urethane polymer saturated foam core of FIG. 1 having the geotextile fabric cover removed;

FIG. 3 is a perspective view of a section of pipe joint sealer which has been packaged in a sealed shrink wrap container such as a moisture resistant polyethylene film to prevent premature exposure to moisture;

FIG. 4 is an exploded view of the pipe joint sealer of the present invention as it is installed upon a joint of two sections of corrugated or ribbed metal pipe;

FIG. 5 is a perspective view of the two sections of metal pipe of FIG. 4 after the band coupler has been installed upon the pipe.

DETAILED DESCRIPTION OF THE PREFERRED EMBODIMENT

Figure 6:
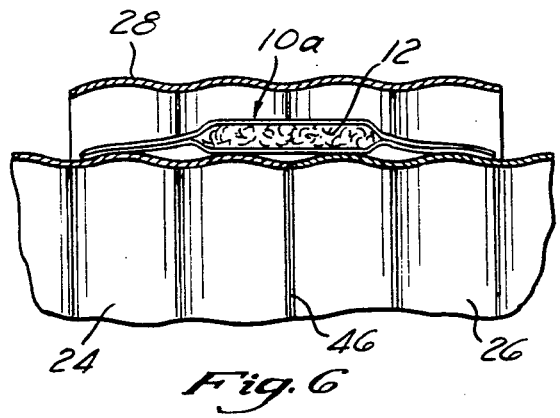
FIG. 6 is an enlarged sectional side view of the pipe joint sealer of the present invention that is being applied to metal pipe shown in FIG. 4 prior to tightening the band coupler and thereby compressing the pipe joint sealer.

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The pipe joint sealer of the present invention is illustrated in FIGS. 1 through 11b which depict a presently preferred embodiment of the invention.

Referring now to FIGS. 1 and 2, the pipe joint sealer 10 of the present invention is depicted comprising a substrate material or core 12 preferably composed of a low density, open cell, resilient foam material. Alternatively, the core 12 may be comprised of other substrate materials, such as sawdust, hemp, open celled paper or the like. Those skilled in the art will recognize that many water absorbent and resilient substrate materials are suitable. The core 12 is saturated with a water reactive urethane prepolymer, such as that manufactured by Polycoat Products of Santa Fe Springs, Calif. and marketed under its Federally Registered Trademark PENEGROUT. Such urethane prepolymers, upon contact with water, react to experience a substantial volumetric increase which in the present invention serves to initially cause the foam core 12 to expand and subsequently seal the foam core 12 against further water absorption or transmission. Those skilled in the art will recognize that other materials are known which expand when exposed to water and which are suitable for use with the present invention. The core 12 is preferably sandwiched between two layers 14 and 16 of a preferably light weight durable geotextile fabric such as polypropylene. Three to four ounce polypropylene is suitable. Those skilled in the art will recognize however that other durable fabrics are also suitable. The two sheets 14 and 16 of polypropylene are punch-perforated or fabricated from non-woven open cell techniques thereby forming a water porous or perforated covering 11 which encloses the core 12. A stitch bind or seam 20 on either side of the core 12 further secures the upper 14 and lower 16 sheets of polypropylene, thus preventing delamination. Two flaps 13 and 15 are preferably formed from the polypropylene covering 11. These flaps 13 and 15 are used to secure the pipe joint sealer 10 in place. However other polymers such polyester or the like are equivalent substitute material candidates.

Due to the porosity of the punch bonded polypropylene textile sheets 14 and 16, water is capable of passing through the sheets 14 and 16 to be absorbed by the foam core 12. Alternatively apertures 18 may be formed in the upper 14 and/or lower 16 layer of polypropylene sheets to permit water to pass therethrough and to be absorbed by the core 12. Thus, wetting or the pipe joint sealer 10 will cause the prepolymer contained within the core 12 to react with moisture passing through the sheets 14 and 16 and expand and form a watertight seal when installed. Such wetting occurs each time water flows through the pipes being sealed as well as when moisture, such as ground water, exists about a pipe.

The pipe joint sealer 10 of the present invention is preferably enclosed in a hermetically sealed moisture evacuated package 22 (shown in FIG. 3) which prevents the core 12 from prematurely reacting to environmental moisture. Due to enhanced water resistance, low density polyethylene shrink wrap is used in the preferred embodiment, however, those skilled in the art will recognize that other container materials are suitable. Premature exposure to moisture does not have any long term or damaging effect upon the pipe joint sealer 10 but is undesirable. Premature exposure of the core 12 to moisture causes the core 12 to prematurely expand, thereby making prolonged inventory storage and transportation of the pipe joint sealer 10 of the present invention difficult. It is therefore desirable to isolate the pipe joint sealer 10 from moisture prior to use.

Referring now to FIG. 4, installation of the pipe joint sealer 10 of the present invention upon a conventional metal pipe is illustrated. To install the pipe joint sealer 10 of the present invention upon metal piping, such as corrugated or ribbed piping and the like, a section or length of pipe joint sealer 10 is removed from its protective package 22 and is initially placed at approximate midsection length within a conventional lower band coupler 30 with the apertures 18 disposed uppermost. The pipe joint sealer 10 is preferably sized of sufficient length to extend approximately equal to or slightly more than the circumference of the pipes 24 and 26 to be joined.

The pipe joint sealer 10 is then elevated within the lower band ooupler 30 into contact with the lower portion of the pipes 24 and 26 at the joint 46. Next, with the lower band coupler maintained in its elevated position, the upper portion of the joint 46 is overlaid with the opposite end portions 10a of pipe joint sealer 10. As such, the entire length of pipe joint sealer 10 is laid about the periphery of the pipes 24 and 26 such that the pipe joint sealer fully encircles the joint 46. The upper band coupler 28 is then placed over the upper portion and ends 10a of pipe joint sealer 10 with the ends 10a of pipe joint sealer preferably overlapping one another. Bolts 32 may then be used to secure the upper 28 and lower 30 band couplers together as shown in FIG. 5 to compress the pipe joint sealer 10 tightly against the periphery of the pipes and 26 over the joint 46.

Figure 7:
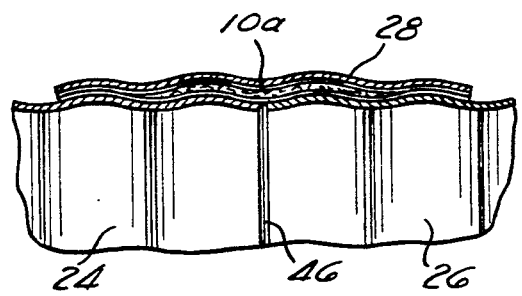
FIG. 7 is a sectional side view of the pipe joint sealer and metal pipe of FIG. 6 after the band coupler has been tightened, thus compressing the pipe joint sealer.

Referring to FIG. 6, the pipe joint sealer 10 of the present invention is illustrated immediately prior to tightening the two band couplers 28 and 30 together. As shown, the sealer 10 spans across the joint 46 overlaying opposite end portions of the adjacent pipe lengths 24 and 26. FIG. 7 depicts the pipe joint sealer 10 after it has been compressed by the band couplers whereby it has conformed to the shape of the void between the two sections and 26 of metal pipe and the band coupler 28. The pipe joint sealer 10 thus forms a continuous physical barrier as well as a dynamic watertight seal at the joint 46 of pipe sections 24 and 26 upon being wetted by moisture.

Figure 8:
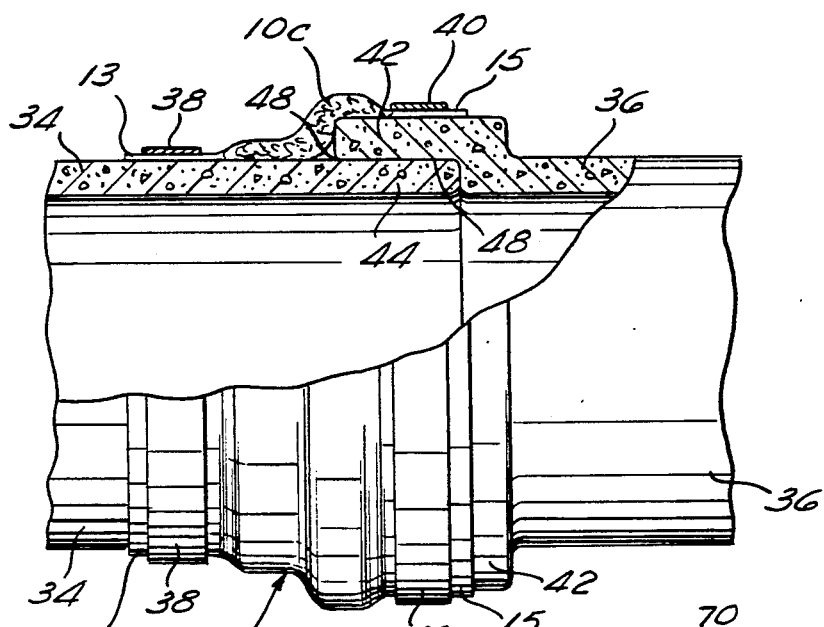
FIG. 8 is a sectional side view of the pipe joint sealer of the present invention showing its installation on a cast concrete pipe or the like having a bell and spigot joint.

Referring now to FIG. 8, installation of the pipe joint sealer 10 of the present invention upon ooncrete, plastic, vitreous clay pipes or the like is illustrated. A continuous strip of pipe joint sealer 10c is preferably used to provide a watertight seal between joined sections of such pipe 34 and 36. To apply the pipe joint sealer 10c, the pipe sections 34 and 36 are first aligned and the spigot 44 of pipe section 34 is inserted into the bell 42 of pipe section 36. Next a section of pipe joint sealer 10c of sufficient length to completely encircle the joint 48 and to overlap at the ends of the pipes is wrapped about the joint 48. The section of pipe joint sealer 10c is wrapped about the joint 48 with the apertures 18 of the pipe joint sealer 10c facing toward the pipe joint 48. Next, band straps 38 and 40 are applied over the flaps 13 and 14 of the pipe joint sealer 10c to secure the pipe joint sealer 10c in place and to provide a physical barrier and watertight seal about the pipe joint 48. Band straps such as those commonly used in packaging goods for transportation and storage but which are corrosive and rust resistant are suitable. The pipe joint sealer 10c of the present invention may be sprayed with water to cause the core 12 to expand and to conform to the shape of the joint 48 if desired after installation.

After being formed to the shape of the joint 48 between first 34 and second 36 sections of concrete pipe, the pipe joint sealer 10c of the present invention remains flexible such that moderate relative movement of the pipe sections 34 and 36 will not cause the pipe joint sealer 10c to crack or otherwise be damaged. Rewetting of the pipe joint sealer 10c each time water flows through the pipes or from environmental moisture about the exterior of the pipe causes it to once again volumetrically expand and conform to the shape of the joint 48 and form a watertight seal. The flexibility and durability of the geotextile fabric will prevent the introduction of foreign material into the pipe under all except the most extreme circumstances.

Figure 9:
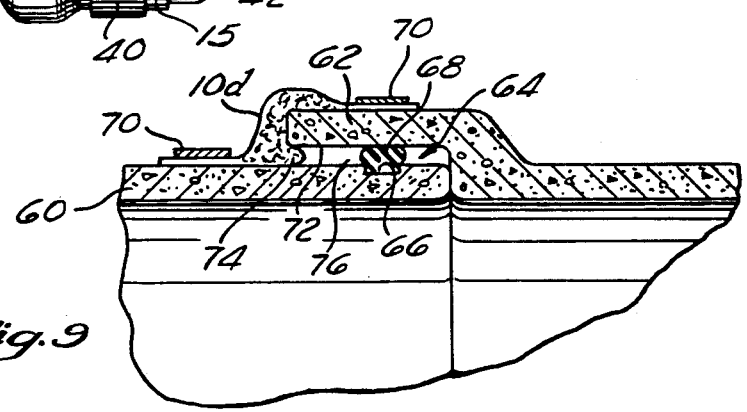
FIG. 9 is a sectional side view of the pipe joint sealer of the present invention showing its installation on a cast concrete pipe or the like having a spigot groove with confined O-ring joint.

Referring to FIG. 9, installation of the pipe joint sealer 10 of the present invention upon concrete pipe, plastic, vitreous clay or the like having a conventional spigot and bell with a grooved or confined O-ring gasket is depicted. As shown, the spigot section 60 of a conventional pipe length and bell section 62 of a pipe length are interconnected to form a pipe length 62 of a pipe length are interconnected to form a pipe joint 64.

The spigot section 60 includes an annular groove or recess 66 which supports an annular O-ring gasket 68 typically formed of an elastomeric material such as rubber. The O-ring 66 seats against the inside diameter of bell portion 62 to form a conventional seal between the pipe lengths 60 and 62 respectively. The pipe joint sealer 10d of the present invention is preferably applied about the external diameter of the bell portion 62 by way of a conventional band strap 70 to affix one end of the pipe joint sealer 10d thereto. The pipe joint sealer 10d may then be initially wrapped downwardly about the end of the bell portion 62 so as to extend a short distance within the interior or inside diameter 72 of the bell portion 62. The spigot portion 60 may then be aligned with the bell portion 62 and be axially moved toward the bell portion 62 whereby during such axial relative movement, a relatively small portion 74 of the core of the pipe joint sealer 10d is captured and axially pushed within the void 76 formed between the inside diameter 72 of the bell portion 62 and outside diameter of the spigot portion 60. Subsequently, upon full insertion of the spigot 60 within the bell portion 62, an additional band strap 70 may be applied to the distal annular end of the pipe joint sealer 10d to maintain the pipe joint sealer 10d in the position illustrated in FIG. 9. As will be recognized, upon wetting of the core of the pipe joint sealer 10d, a volumetric expansion occurs which due to the captured portion 74 of the core maintain a fluidic seal between the inside diameter of the bell portion 62 and outside diameter of the spigot portion 60 of the adjacent pipe sections. Although this capturing technique of the pipe joint sealer 10d has been disclosed in relation to a conventional spigot groove with confined O-ring pipe joint arrangement, those skilled in the art will recognize that the same technique is applicable to other conventional pipe joint configurations such as opposing shoulder bell and spigot arrangements with O-rings.

Figure 10A:
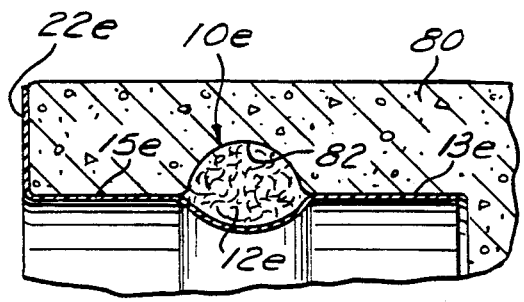
FIG. 10A is an enlarged sectional view of the pipe joint sealer of the present invention disposed within a groove formed within the bell of a conventional pipe section, which pipe joint sealer is preferably formed therein during manufacture of the pipe section.

Referring to FIG. 10A, an additional embodiment of the pipe joint sealer 10e of the present invention is depicted which is typically adapted for installation at the time of manufacture of a conventional length of concrete, plastic, or vitreous clay pipe. As shown in FIG. 10A, the bell portion 80 of a conventional pipe length is provided with an annular groove or recess 82. In this embodiment, the pipe joint sealer 10e is formed such that the foam core 12e is formed having a generally cylindrical cross section which is complementary to the interior of the groove 82. The flaps 13e and 15e of the pipe joint sealer 10e are secured to the interior of the pipe length 80 in a generally contiguous orientation such as by way of a suitable adhesive such that the pipe joint sealer 10e is disposed completely within the interior of the bell portion 80 of the pipe length. To maintain the pipe joint sealer 10e in a non-reactive environment, a suitable layer of water resistant materials such as a polyethylene sheet 22e may extend over the pipe seal 10e and cover its entire annular interior surface disposed within the bell 80. Preferably, the polyethylene sheet 22e is formed as a peel off sheet which may be separated from the pipe joint seal 10e when desired while leaving the pipe joint seal 10e disposed in its configuration depicted in FIG. 10A.

Figure 10B:
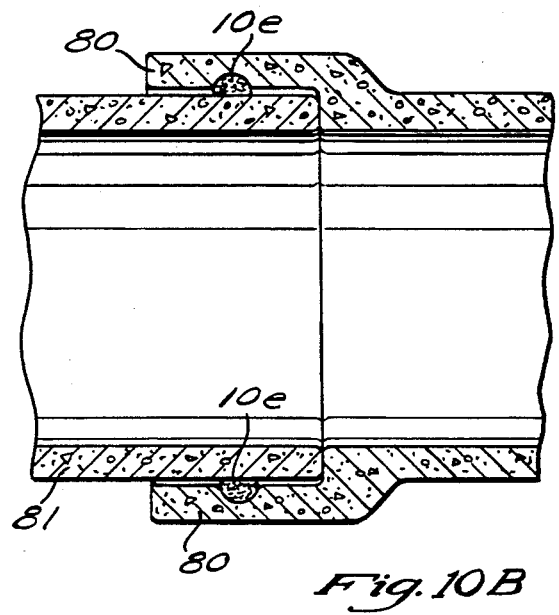
FIG. 10B is a cross sectional view of the pipe joint sealer of FIG. 10A disposed between the bell and spigot of the pipe joint.

When desired to form a pipe joint, the shrink wrap sheet 22e may be manually removed from the joint seal 10e and a spigot section 81 of an adjacent pipe length may be inserted into the bell portion 80 in a conventional manner. As depicted in FIG. 10B, when the spigot 81 is completely inserted within the bell 80, the spigot 81 compresses the foam core 12e of the pipe joint seal 10e tightly between the exterior diameter of the spigot 81 and bell 80 thereby forming a seal therebetween. After installation, moisture contacting the core 12e of the pipe joint sealer 10e via migration between the diameters of the spigot 81 and bell 80 causes a reaction as described infra causing a dynamic water tight and physical seal to be formed between the bell 80 and spigot 81.

Figure 11A:
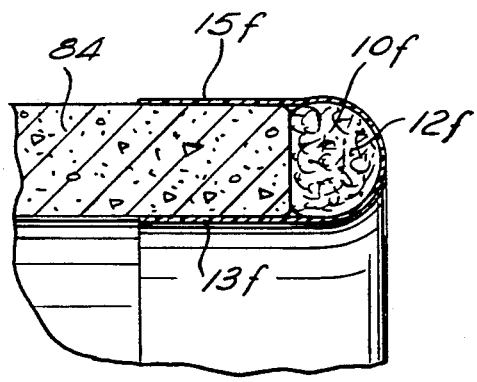
FIG. 11A is an enlarged partial cross sectional view of the pipe joint sealer of the present invention formed as a wrap around belt which may be positioned upon the end of a pipe length.
Figure 11B:
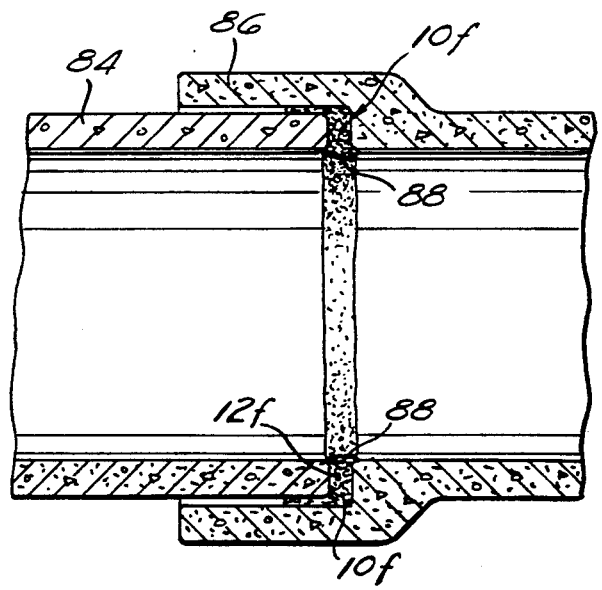
FIG. 11B is a sectional view of the pipe joint sealer of FIG. 11A disposed within the bell section of an adjacent pipe to form a pipe joint.

Referring to FIGS. 11A and 11B, an additional embodiment of the pipe joint seal 10f is depicted which is additionally applicable for use upon concrete, vitreous clay or plastic pipe. In this embodiment, the pipe joint sealer 10f is preferably formed in a ring like configuration which is adapted to fit over the distal end of a spigot 84 of a pipe length. In this embodiment, the wings 15f and 13f are preferably formed to extend a short distance along the interior and exterior of the diameters respectively of the spigot 84 so as to affix the pipe joint seal 10f upon the distal end of the spigot 84 as depicted in FIG. 11a. As such, this embodiment of the pipe joint seal 10f is specifically adapted for standard pipe length so as to be easily utilized in commercial as well as residential applications. When it is desired to form a joint between adjacent pipe sections, the spigot 84 with the pipe joint seal 10f disposed on its distal end as depicted in FIG. 11A may be inserted within the interior of the bell or conventional coupling 86 as depicted in FIG. 11B. Upon axial movement of the spigot 84 relative the bell 86, the core 12f of the pipe joint seal 10f is compressed between the distal end of the spigot 84 and the annular shoulder 88 formed within the bell 86. During this compression, the foam core, 12f fills the spacial voids existing between the interior of the bell 86 and spigot 84 thereby forming a seal therebetween.

As will be recognized, once installed, the pipe joint seal of the present invention in all embodiments and applications will continuously expand and shrink depending upon moisture conditions at the pipe joint. For instance, when water begins to flow through the pipes upon which the pipe joint sealer 10 has been installed or ground water or percolating water contacts the exterior of the pipes, the water will travel through the perforations of the pipe joint sealer and wet the core of the pipe joint sealer. This causes the prepolymer of the pipe joint sealer to volumetrically expand and form a watertight seal at the pipe joint. Alternatively, in periods of low moisture contact, the pipe joint sealer will shrink, thereby allowing the seal to accommodate minor pipe movement while maintaining its physical integrity. As such, the present invention comprises a dynamic seal which accommodates moderate pipe movement and provides a fluidic seal which is automatically activated by water contacting the pipe joint. Further, the present invention provides a consistent or continuous physical barrier or dry filter to fines and other debris preventing the same to pass within the interior of the pipe irrespective of moisture considerations.

In any or all embodiments of the pipe joint seal of the present invention, the water reactive prepolymer contained within the core 12 may include a quantity of finely ground copper dust, or copper compounds such as cupric carbonate or an herbicide such as trifluralin or indolebutyric acid. Preferably, the finely ground copper or copper compounds are mixed with the prepolymer in a ratio from one to five parts copper per 100 parts prepolymer while various quantities of herbicide may simultaneously or alternatively be uniformly dispersed within the prepolymer. Due to the prepolymer being disposed within the core 12, when the prepolymer reacts with water or moisture and expands into the pipe joint, the copper, copper compounds or suspended herbicide incorporated into the prepolymer acts as an effective durable deterrent to plant root growth and root penetration into the pipe joint. Further, since the copper, copper compounds and/or herbicides are incorporated into the prepolymer, they are maintained in their desired location i.e. at the pipe joint seal, so as to effectively deter root growth at the seal location and additionally will be resistant from migration or leaching into the pipe interior or ground water. As such, the pipe joint seal 10 of the present invention provides an effective means of retarding plant root growth into the interior of pipe sections which hereto has degraded pipe joint seals as well as in severe instances, serves to completely close off the interior of the pipe lengths preventing water flow therethrough It is understood that the exemplary pipe joint sealer described herein and shown in the drawings represents only a presently preferred embodiment of the invention. Indeed, various modifications and additions may be made to such embodiment without departing from the spirit and scope of the invention. For example, the size and shape of the core may be varied considerably while maintaining its function as an expanding seal. Also, the dimensions of the flaps can be varied considerably without impairing their function. Various materials may be utilized as a cover for the core. Various core materials are contemplated. Thus, these and other modifications and additions may be obvious to those skilled in the art and may be implemented to adapt to the present invention for use in a variety of different applications.

What is claimed is:

1. A dynamic pipe joint sealer attachable to adjacent end portions of two sections of pipe for providing a water tight seal between the two sections of pipe and for preventing the introduction of foreign material into the interior of the pipe sections, the pipe joint sealer comprising:
   (a) a resilient substrate material, said substrate being impregnated with a urethane prepolymer so as to be reactive to moisture such that the substrate material expands when exposed to moisture and contracts toward substantially its original volume when dry; and
   (b) a durable fabric covering substantially surrounding said substrate material, said fabric being adapted to allow moisture to pass from the environment to the impregnated substrate while preventing the passage of foreign material and fines to the impregnated substrate.

2. The pipe joint sealer as recited in claim 1 wherein at least a portion of the fabric covering has a plurality of apertures formed therein to transmit moisture from the environment to the substrate material.

3. The pipe joint sealer as recited in claim 1 wherein the cover comprises a geotextile fabric.

4. The pipe joint sealer as recited in claim 3 wherein the cover comprises polypropylene.

5. The pipe joint sealer as recited in claim 4 wherein the cover is formed of two layers of polypropylene, said layers of polypropylene being bonded together.

6. The pipe joint sealer as recited in claim 5 further comprising at least one stitch bind for securing said layers of polypropylene together.

7. The pipe joint sealers as recited in claim 4 further comprising a pair of flap portions, one flap portion being formed along either side of said substrate material.

8. The pipe joint sealer as recited in claim 1 wherein said resilient substrate material comprises an open cell foam.

9. The pipe joint sealer as recited in claim 8 wherein said substrate material additionally includes a copper compound therein.

10. The pipe joint sealer as recited in claim 8 wherein said substrate material additionally includes an herbicide therein.

11. The pipe joint sealer as recited in claim 8 further comprising a heat shrink polyurethane package which surrounds the pipe joint sealer to prevent premature contact of the pipe joint sealer with moisture.

12. A dynamic pipe joint sealer for providing a water tight seal between two sections of pipe and for preventing the introduction of foreign material into the pipe, the pipe joint sealer comprising:
   (a) a resilient substrate material, said substrate material being impregnated with a urethane prepolymer so as to expand upon contact with moisture and contract toward substantially its original volume when dry;
   (b) a first layer of fabric material, said first layer of fabric material being generally laminarily juxtaposed a first side of said substrate material and extending beyond said substrate on either side thereof, said first layer being adapted to allow moisture to pass from the environment to the impregnated substrate while preventing the passage of foreign material and fines to the impregnated substrate; and
   (c) an elongate second layer of fabric material, said second layer of fabric material being generally laminarily juxtaposed a second side of said substrate material and cooperating with said first layer to form a cover which substantially surrounds said substrate material and forms flaps along either side of said substrate material.

13. The pipe joint sealer as recited in claim 12 further comprising a stitch bind along either side of said substrate material to secure said first and second layers of fabric material together.

14. The pipe joint sealer as recited in claim 12 wherein said first and second layers of fabric material are comprised of polypropylene.

15. The pipe joint sealer as recited in claim 14 wherein said first and second layers of polypropylene are bonded together.

16. A method for sealing pipe joints comprising the steps of:
   (a) wrapping the pipe joint with a resilient substrate material impregnated with a urethane prepolymer so as to be reactive to moisture such that the substrate material expands when exposed to moisture and contracts toward substantially its original volume when dry, wherein said resilient substrate is substantially surrounded by a geotextile fabric covering adapted to allow moisture to pass from the environment to the impregnated substrate while preventing the passage of foreign material and fines to the impregnated substrate; and
   (b) applying a clamping device about said pipe joint such that the substrate material disposed within the geotextile covering is captured intermediate the clamping device and the pipe joint.

17. A method of sealing a spigot and bell pipe joint comprising the steps of:
  (a) disposing a substrate material impregnated with a urethane prepolymer and enclosed within a geotextile fabric cover between the spigot and the bell of the pipe joint; and
  (b) compressing said substrate material disposed within the geotextile fabric between said spigot and said bell to maintain said substrate material in a position so as to be contacted by moisture extending about said bell and said spigot, expanding said substrate material by moisture absorption to form an expanded sealing at the pipe joint, and contracting said substrate material toward substantially its original volume upon removal of the moisture to a dry state for again expanding said substrate material upon reoccurring contact with moisture.

* * * * *